(12) United States Patent
Saito et al.

(10) Patent No.: US 7,400,616 B2
(45) Date of Patent: Jul. 15, 2008

(54) WIRELESS PACKET COMMUNICATION METHOD AND WIRELESS PACKET COMMUNICATION APPARATUS

(75) Inventors: Kazuyoshi Saito, Hachioji (JP); Tomoaki Kumagai, Yokosuka (JP); Shinya Otsuki, Yokohama (JP); Kengo Nagata, Yokohama (JP); Satoru Aikawa, Yokohama (JP); Atsushi Ohta, Yokosuka (JP); Akinori Hirukawa, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 254 days.

(21) Appl. No.: 10/545,489

(22) PCT Filed: Jun. 18, 2004

(86) PCT No.: PCT/JP2004/008909

§ 371 (c)(1),
(2), (4) Date: Aug. 12, 2005

(87) PCT Pub. No.: WO2004/114608

PCT Pub. Date: Dec. 29, 2004

(65) Prior Publication Data

US 2006/0087998 A1 Apr. 27, 2006

(30) Foreign Application Priority Data

Jun. 18, 2003 (JP) .............................. 2003-173914
Oct. 22, 2003 (JP) .............................. 2003-361846

(51) Int. Cl.
*H04J 3/24* (2006.01)

(52) U.S. Cl. ..................... 370/349; 370/328; 370/338; 370/445; 455/69; 455/517; 714/748

(58) Field of Classification Search ................. 370/328, 370/338, 349, 389, 277–278, 282, 445; 714/749, 714/750, 776; 455/69, 502, 39, 515–517, 455/422.1

See application file for complete search history.

(56) References Cited

U.S. PATENT DOCUMENTS 4,989,204 A 1/1991 Shimizu et al.

(Continued)

FOREIGN PATENT DOCUMENTS

EP 1207635 5/2002

(Continued)

OTHER PUBLICATIONS

International Standard ISO/IEC 8802-11 ANSI/IEEE Std 802.11, 1999 edition, Information technology—Telecommunications and information exchange between systems—Local and metropolitan area networks—Specific requirements—Part 11: Wireless LAN Medium Access Control (MAC) and Physical Layer (PHY) specifications.

(Continued)

*Primary Examiner*—George Eng
*Assistant Examiner*—Kamran Afshar
(74) *Attorney, Agent, or Firm*—Harness, Dickey & Pierce, P.L.C.

(57) ABSTRACT

A plurality of data packets that contain sequence numbers, respectively, are transmitted simultaneously between two STAs by using a wireless channel and MIMO. An STA receiving the plurality of data packets transmitted simultaneously by using MIMO generates a single ACK packet containing information that corresponds to a sequence number of each data packet successfully received, and transmits the single ACK packet to a transmit-side STA without using MIMO. Thus, a ratio of successful ACK packet receptions to total receptions can be increased. An effect of improving throughput achieved by simultaneous transmission can also be ensured.

14 Claims, 13 Drawing Sheets

U.S. PATENT DOCUMENTS

| | | | |
|---|---|---|---|
| 6,021,124 A | | 2/2000 | Haartsen |
| 6,266,360 B1 | | 7/2001 | Okamoto |
| 6,760,882 B1 | * | 7/2004 | Gesbert et al. ............... 714/774 |
| 7,006,464 B1 | * | 2/2006 | Gopalakrishnan et al. ... 370/328 |
| 2002/0159431 A1 | * | 10/2002 | Moulsley et al. ............ 370/347 |
| 2003/0036359 A1 | * | 2/2003 | Dent et al. .................... 455/63 |
| 2003/0067890 A1 | * | 4/2003 | Goel et al. ............... 370/310.1 |
| 2003/0072452 A1 | * | 4/2003 | Mody et al. ................. 380/274 |
| 2003/0118031 A1 | * | 6/2003 | Classon et al. ......... 370/395.54 |
| 2003/0131124 A1 | * | 7/2003 | Yi et al. ...................... 709/236 |
| 2003/0169769 A1 | * | 9/2003 | Ho et al. ...................... 370/473 |
| 2003/0214906 A1 | * | 11/2003 | Hu et al. ...................... 370/231 |
| 2004/0133391 A1 | * | 7/2004 | Bovo et al. ................... 702/178 |
| 2004/0213184 A1 | * | 10/2004 | Hu et al. ...................... 370/335 |
| 2005/0233709 A1 | * | 10/2005 | Gardner et al. .............. 455/101 |
| 2005/0255805 A1 | * | 11/2005 | Hottinen ......................... 455/8 |
| 2005/0277422 A1 | * | 12/2005 | Baker et al. ................. 455/450 |
| 2006/0018259 A1 | * | 1/2006 | Kadous ....................... 370/236 |
| 2006/0034178 A1 | * | 2/2006 | Yang et al. .................. 370/236 |
| 2006/0171353 A1 | * | 8/2006 | Nagata et al. ............... 370/329 |
| 2006/0233146 A1 | * | 10/2006 | Nagata et al. ............... 370/342 |

FOREIGN PATENT DOCUMENTS

| | | |
|---|---|---|
| JP | 62-30439 A | 2/1987 |
| JP | 1-204543 A | 8/1989 |
| JP | 10229383 | 8/1998 |
| JP | 2001-516177 A | 9/2001 |
| WO | WO9908423 | 2/1999 |

OTHER PUBLICATIONS

IEEE Std 802.Nov. 1997, Information technology—Telecommunications and information exchange between systems—Local and metropolitan area networks—specific requirements—Part 11: Wireless LAN Medium Access Control (MAC) and Physical Layer (PHY) specifications.

Haitao Zheng, et al, "Multiple ARQ Processes for Mimo Systems, Personal, Indoor and Mobile Radio Communications", 2002. The 13th IEEE International Symposium on Sep. 2002, vol. 3, p. 1023-1026.

Low-powered Data Communication System/Broadband Mobile Access Communication System (CSMA) standard, ARIB STD-T71 version 1.0, Association of Radio Industries and Businesses, Dec. 2000.

Kurosaki et al., "100 Mbit/s SDM-COFDM over MIMO Channel for Broadband Mobile Communications", Technical Report of the Institute of Electronics, Information and Communication Engineers, A-P2001-96, RCS2001-135, 2001-10.

* cited by examiner

WIRELESS PACKET COMMUNICATION METHOD AND WIRELESS PACKET COMMUNICATION APPARATUS

CROSS-REFERENCE TO RELATED APPLICATION

This application is based upon and claims the benefit of priority from Japanese Patent Application No. 2003-173914, filed on Jun. 18, 2003 and No. 2003-361846, filed on Oct. 22, 2003, the entire contents of which are incorporated herein by reference.

TECHNICAL FIELD

The present invention relates to a wireless packet communication method for transferring a plurality of data packets simultaneously between stations (hereinafter, STAs) by using Multiple Input Multiple Output (hereinafter, MIMO). More particularly, the present invention relates to a wireless packet communication method for retransmission processing in the case where data packets are not transferred normally.

BACKGROUND ART

In a conventional wireless packet communication apparatus, a wireless channel to be used is determined in advance. Prior to transmission of data packets, carrier sense is performed to detect whether or not that wireless channel is idle. Only when that wireless channel is idle, one data packet is transmitted. This management process enables a plurality of STAs to share one wireless channel in a staggered manner ((1) International Standard ISO/IEC 8802-11 ANSI/IEEE Std 802.11, 1999 edition, Information technology-Telecommunications and information exchange between systems-Local and metropolitan area networks-Specific requirements-Part 11: Wireless LAN Medium Access Control (MAC) and Physical Layer (phy) specifications", (2) "Low-powered Data Communication System/Broadband Mobile Access Communication System (CSMA) Standard", ARIB STD-T71 version 1.0, Association of Radio Industries and Businesses, settled in 2000).

On the other hand, a wireless packet communication method is studied in order to improve transmission efficiency of data packets, in which a plurality of data packets are transmitted simultaneously on one wireless channel by using a known MIMO technique (Kurosaki et al., "100 Mbit/s SDM-COFDM over MIMO Channel for Broadband Mobile Communications", Technical Reports of the Institute of Electronics, Information and Communication Engineers, A. P 2001-96, RCS2001-135(2001-10)). In the space division multiplexing (SDM), different data packets are transmitted from a plurality of antennas on the same wireless channel at the same time. The data packets transmitted at the same time on the same wireless channel are received by digital signal processing that can deal with the difference in propagation coefficients of the respective data packets received by a plurality of wireless antennas of an opposed STA.

FIG. 14 shows a relationship between a transmitting signal and a receiving signal in MIMO. The relationship between the transmitting signal and the receiving signal is represented by a determinant shown in FIG. 14. Propagation coefficients hxx are unknown on a receive side. Thus, the receive side estimates those propagation coefficients, obtains an inversion matrix of a transmission coefficient containing the propagation coefficients, and calculates transmitting values s1, s2, and s3 from the obtained inversion matrix and receiving values r1, r2, and r3.

In general, the propagation coefficients hxx are changed with time and are also changed by a change in a wireless channel such as fading, reduction in signal intensities, and the like. Moreover, when MIMO number is increased, an effect of the change in the wireless channel on the channel condition becomes large. That is, a packet error rate or a bit error rate becomes larger with the increase of the MIMO number. Therefore, the MIMO number is determined (limited) in accordance with the propagation coefficients and the like.

When transmission of a data packet is unsuccessful, the receive side transmits a response packet indicating that failure or does not transmit any response packet. In this case, the transmitting side determines that transmission of the data packet is unsuccessful, and retransmits the data packet. However, retransmission of data packets simultaneously transmitted using MIMO is not specifically defined. Thus, a problem in the case where a conventional retransmission process is applied to such simultaneous transmission is now described.

FIG. 15 shows a general processing on exchanging data packets. After a transmit-side STA transmits a data packet, a receive-side STA transmits an acknowledgement (hereinafter, ACK) packet for the received data packet, thereby giving notice of information about the ratio of successful receptions of data packets to total receptions in the past on the receive-side STA. That method for transmitting an ACK packet can be applied without change to a wireless packet communication method that uses MIMO. In this case, it is considered that a packet exchange sequence as shown in FIG. 16 is performed.

An STA receiving a plurality of data packets multiplexed by MIMO generates ACK packets. The number of those ACK packets is the same as the number of data packets that are successfully received. The thus generated ACK packets are sent back to an STA that is a sender of the data packets while being multiplexed by MIMO. As the number of the data packets successfully received increases, the number of the ACK packets multiplexed by MIMO also increases. As a result, a ratio of successful ACK packet receptions to total receptions becomes lower with the increase of data packets successfully received. Thus, an effect of improving throughput achieved by transmission of data packets using MIMO is weakened.

This is because the transmit-side STA cannot distinguish failure in receiving of the data packets on the receive-side STA from failure in receiving of the ACK packets sent from the receive-side STA on the transmit-side STA. Thus, when the transmit-side STA does not receive the ACK packet, the transmit-side STA determines that transmission of the data packet is unsuccessful and retransmits the data packet. Therefore, in the case where the ratio of successful ACK packet receptions to total receptions is low, it is highly likely that the transmitting side wrongly determines that transmission of the data packet is unsuccessful although the receive side successfully receives the data packet. As a result, unnecessary control, i.e., transmission of the data packet that does not require retransmission is performed, thus reducing usability of a wireless channel.

It is an object of the present invention to, in the case where a transmit-side STA transmits a plurality of data packets simultaneously by using MIMO, surely transmit a packet containing information about the ratio of successful receptions of data packets and total receptions in the past from a receive side, thereby achieving high throughput.

DISCLOSURE OF THE INVENTION

According to a first aspect of the invention, a plurality of data packets that are transmitted simultaneously between two STAs by using a wireless channel and MIMO contain predetermined sequence numbers for distinguishing the data packets from each other, respectively. An STA receiving those data packets transmitted simultaneously by using MIMO generates a single acknowledge packet containing information that corresponds to a sequence number of each data packet successfully received, and transmits the single acknowledge packet to a transmit-side STA without using MIMO.

In the first aspect of the invention, when a plurality of data packets are received, receiving results are stored as a whole in a single ACK packet, and the ACK packet is transmitted without being multiplexed by MIMO.

Thus, a ratio of successful ACK packet receptions to total receptions can be increased. Therefore, an effect of improving throughput achieved by simultaneous transmission of data packets using MIMO can be ensured. Please note that a standard length of an ACK packet at present is extremely shorter than a length of a data packet, and increase in the length of the ACK packet is very small even if the receiving results of the data packets are added to the ACK packet. Therefore, the effect of improving the throughput cannot be impeded.

According to a second aspect of the invention, a transmit-side STA transmits a plurality of data packets simultaneously by using MIMO and thereafter transmits a negative acknowledgement request packet (hereinafter, NACK request packet) for requesting a negative acknowledge packet (hereinafter, NACK packet) from a receive-side STA without using MIMO. The NACK request packet contains information that corresponds to the sequence numbers of all the data packets transmitted simultaneously. The receive-side STA receives the plurality of data packets transmitted simultaneously by using MIMO, generates a single NACK packet containing information that corresponds to a sequence number of each data packet not received unsuccessfully among the sequence numbers acquired by receiving the NACK request packet, and transmits the single NACK packet to the transmit-side STA without using MIMO.

In the second aspect of the invention, the NACK request packet and the NACK packet are transmitted without being multiplexed by MIMO. Therefore, a ratio of successful packet receptions to total receptions can be increased.

According to a third aspect of the invention, a transmit-side STA simultaneously transmits a plurality of data packets continuously by using MIMO, and thereafter transmits an acknowledgement request packet (hereinafter, ACK request packet) for requesting an ACK packet from a receive-side STA without using MIMO. The ACK request packet contains information that corresponds to sequence numbers of all the data packets transmitted simultaneously continuously. The receive-side STA receives the plurality of data packets transmitted simultaneously continuously by using MIMO, generates a single ACK packet containing information that corresponds to a sequence number of each data packet successfully received among the sequence numbers acquired by receiving the ACK request packet, and transmits the single ACK packet to the transmit-side STA without using MIMO.

In the third aspect of the invention, when receiving a plurality of data packets that are transmitted simultaneously continuously by using MIMO, the receive-side STA also stores all receiving results as a whole in one ACK packet and transmits that ACK packet without using MIMO. Therefore, a ratio of successful ACK packet receptions to total receptions can be increased. Moreover, a ratio of successful ACK packet receptions to total receptions can be increased also because the ACK request packet is also transmitted without being multiplexed by MIMO.

According to a forth aspect of the invention, a transmit-side STA simultaneously transmits a plurality of data packets continuously by using MIMO, and thereafter transmits a NACK request packet for requesting a NACK packet from a receive-side STA without using MIMO. The NACK request packet contains information that corresponds to sequence numbers of all the data packets transmitted simultaneously continuously. The receive-side STA receives the plurality of data packets transmitted simultaneously continuously by using MIMO, generates a single NACK packet containing information that corresponds to a sequence number of each data packet not received successfully among the sequence numbers acquired by receiving the NACK request packet, and transmits the single NACK packet to the transmit-side STA without using MIMO.

In the forth aspect of the invention, when receiving a plurality of data packets that are transmitted simultaneously continuously by using MIMO, the receive-side STA also stores all receiving results in one NACK packet and transmits the NACK packet without using MIMO. This makes it possible to increase a ratio of successful NACK packet receptions to total receptions. Moreover, it is possible to increase a ratio of successful NACK request packet receptions to total receptions also because the NACK request packet is also transmitted without being multiplexed by MIMO.

According to a fifth aspect of the invention, the STA transmitting the ACK packet transmits the ACK packet at a transmission rate that falls within a range from a lowest one of transmission rates the STA has to a lowest one of transmission rates at which the STA has successfully received data packets.

According to a sixth aspect of the invention, the STA transmitting the NACK packet transmits the ACK packet at a transmission rate that falls within a range from a lowest one of transmission rates the STA has to a lowest one of transmission rates at which the STA has successfully received data packets.

According to a seventh aspect of the invention, the STA transmitting the NACK request packet or NACK request packet transmits the ACK request packet or NACK request packet at a transmission rate that falls within a range from a lowest one of transmission rates the STA has to a lowest one of transmission rates at which the STA has transmitted data packets.

In the fifth and seventh aspects of the invention, appropriately setting the transmission rate can increase the ratio of successful receptions of the ACK packet, NACK packet, ACK request packet, and NACK request packet to total receptions.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

BEST MODE FOR CARRYING OUT THE INVENTION

Embodiment 1

Figure 1:
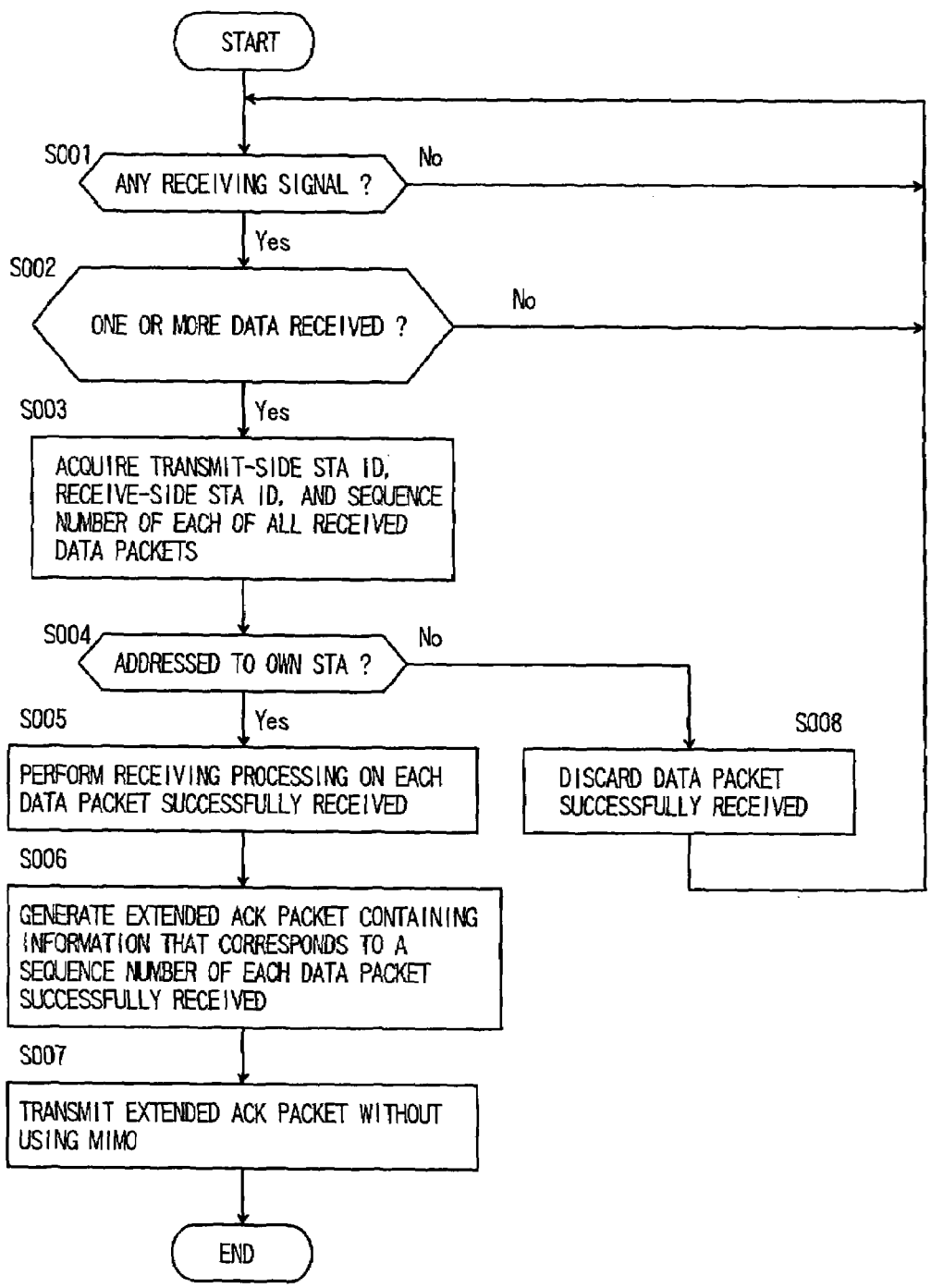
FIG. 1 is a flowchart according to a first embodiment of the present invention.
Figure 2:
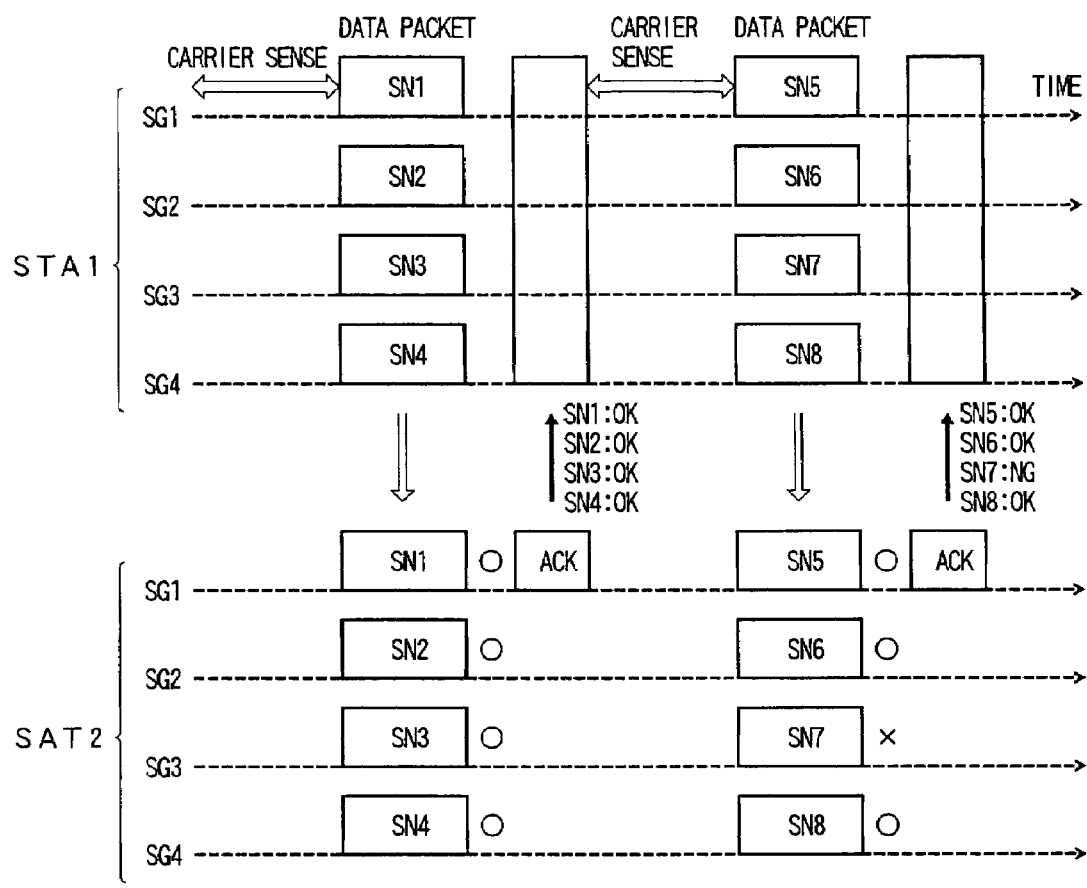
FIG. 2 is a time chart of an exemplary operation in the first embodiment of the present invention.

FIG. 1 is a flowchart according to a first embodiment of the present invention. FIG. 2 shows an exemplary operation in the first embodiment of the present invention.

Figure 11:
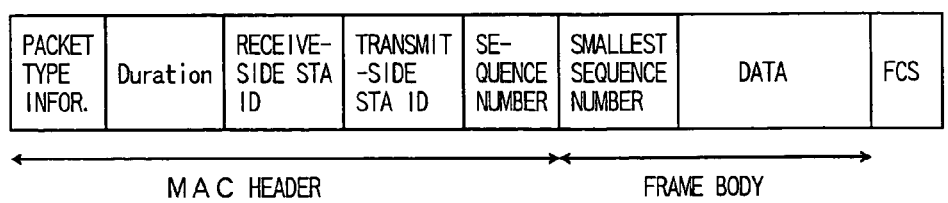
FIG. 11 illustrates a structure of a data packet.

A data packet contains a data part and also contains packet type information, identification information (ID) of a receive-side STA, identification information (ID) of a transmit-side STA, a sequence number assigned for distinguishing a plurality of data packets transmitted simultaneously from each other, and a smallest one of sequence numbers of the data packets transmitted simultaneously, as shown in FIG. 11.

In the present embodiment, an ACK packet that gives notice of successful receiving of a plurality of data packets as a whole is called as an extended ACK packet. This extended ACK packet contains packet type information, receive-side STA ID (a transmit-side STA of a data packet), and a sequence number of each data packet successfully received, in an example of FIG. 12(1). Alternatively, in an example of FIG. 12(2), a bitmap is used instead of describing the sequence number of each data packet successfully received. This bitmap represents successful receiving of a data packet by setting a bit corresponding to the sequence number of that data packet to a value in accordance with success or failure in receiving of that data packet. The most significant bit (MSB) in the bitmap corresponds to one of a plurality of data packets transmitted simultaneously that has the smallest sequence number. Please note that the example of FIG. 12(2) is used for responding to an extended ACK request packet that will be described later.

Returning to FIG. 1, a receive-side STA determines whether or not there is a receiving signal (S001). When sensing the receiving signal, the receive-side STA determines whether or not one or more data packets are received (S002). In the case where at least one data packet is received, the receive-side STA acquires a transmit-side STA ID, a receive-side STA ID, and information on a sequence number that are contained in each of all received data packets (S003).

Then, the receive-side STA determines whether or not the received data packet is addressed to an own STA. When the received data packet is addressed to another STA, the receive-side STA discards the received data packet (S004 and S008). When the received packet is addressed to the own STA, the own STA performs a receiving processing on each data packet (S005) and generates an extended ACK packet containing information corresponding to a sequence number of each data packet (S006). Then, the receive-side STA transmits the extended ACK packet to an STA that is a sender of the data packets without using MIMO (S007).

In the exemplary operation of FIG. 2, SG1 to SG4 represent signals of respective series multiplexed by MIMO. In this example, a case is considered in which signals of four series are multiplexed by MIMO. SN1 to SN8 represent sequence numbers of data packets, respectively.

A transmit-side STA 1 transmits four data packets simultaneously on one wireless channel by using MIMO after carrier sense having a constant duration. A receive-side STA 2 generates an extended ACK packet containing information that corresponds to a sequence number of each data packet successfully received among the sequence numbers SN1 to SN4 of the four data packets transmitted simultaneously. The STA 2 transmits the extended ACK packet to the STA 1 without multiplexing it by MIMO. The above operation is repeated.

Embodiment 2

Figure 3:
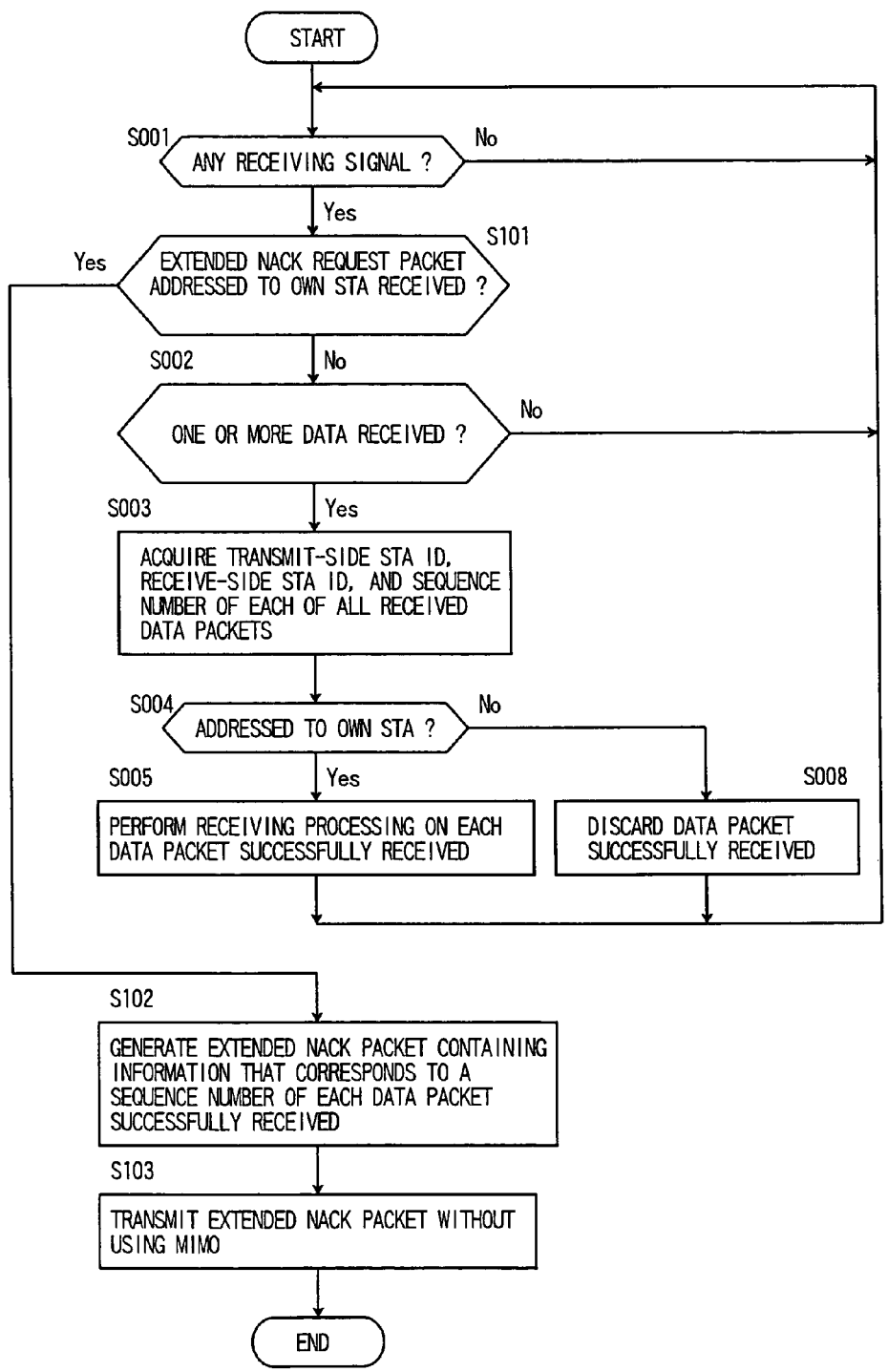
FIG. 3 is a flowchart according to a second embodiment of the present invention.
Figure 4:
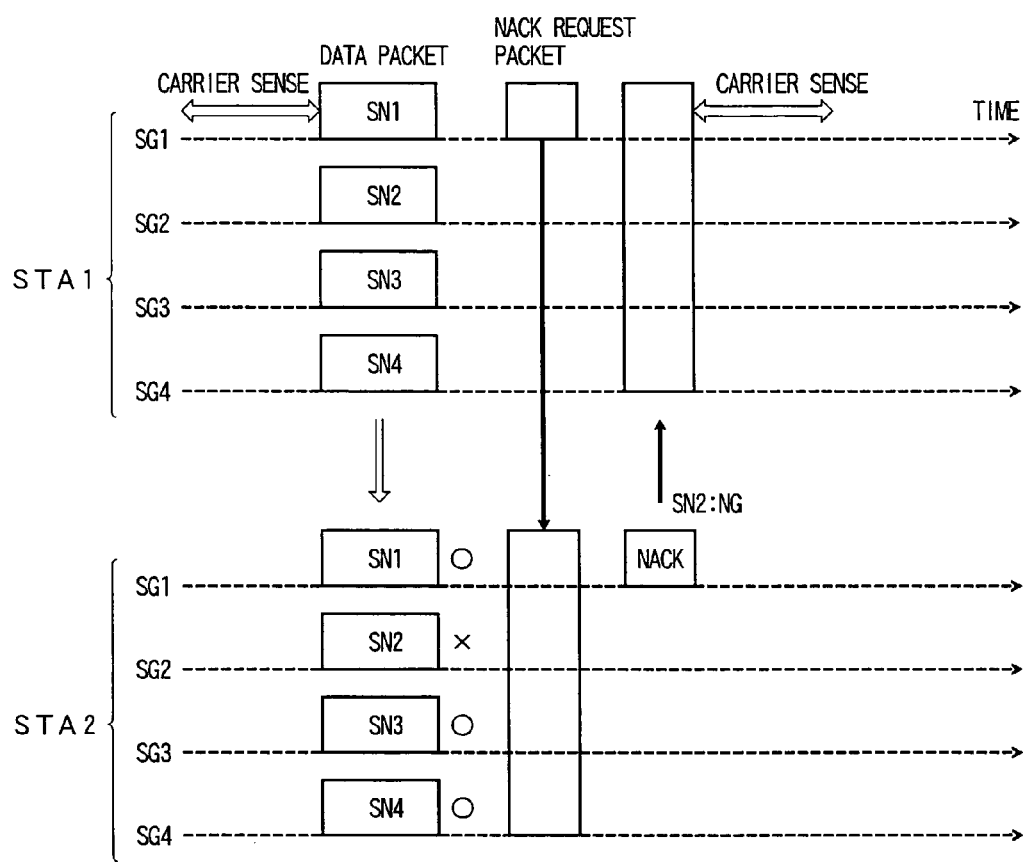
FIG. 4 is a time chart of an exemplary operation in the second embodiment of the present invention.

FIG. 3 is a flowchart according to a second embodiment of the present invention. FIG. 4 shows an exemplary operation in the second embodiment of the present invention.

In the present embodiment, one NACK packet that gives notice of failure in receiving of a plurality of data packets as a whole is called as an extended NACK packet. This extended NACK packet is similar to the extended ACK packet shown in FIG. 12, and contains packet type information, receive-side STA ID (a transmit-side STA of data packets), and a sequence number of each data packet not received successfully in the example of FIG. 12(1). Alternatively, in the example of FIG. 12(2), instead of describing the sequence number of each data packet not received successfully, a bitmap is used. The bitmap represents failure in receiving of a data packet by setting a bit corresponding to the sequence number of that data packet to a value in accordance with success or failure in receiving of that data packet. The most significant bit (MSB) in the bitmap corresponds to a data packet having the smallest sequence number among a plurality of data packets transmitted simultaneously.

The NACK packet is sent back to the transmit-side STA of the data packets in response to a NACK request packet transmitted from the transmit-side STA of the data packets for confirming success and failure in receiving of the respective data packets. In the present embodiment, one NACK request packet for requesting a notice of success and failure in receiving of a plurality of data packets transmitted simultaneously is called as an extended NACK request packet. An extended ACK request packet for requesting an extended ACK packet is similar to the NACK request packet.

Figure 13:
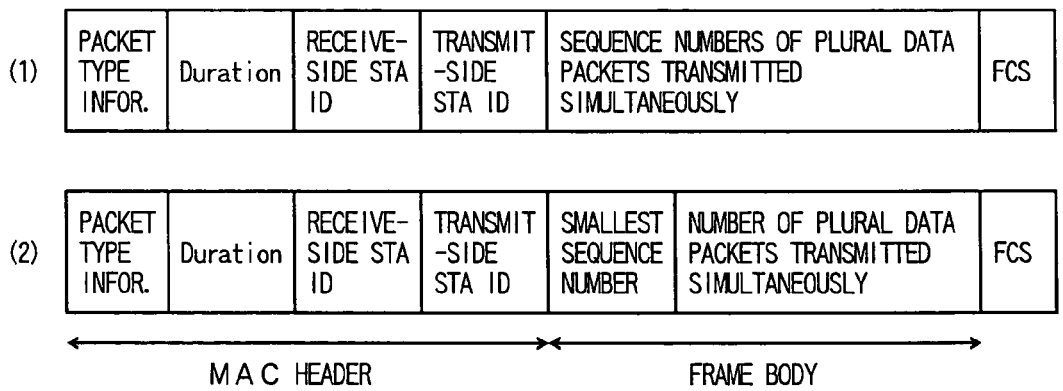
FIG. 13 illustrates structures of an extended NACK request packet and an extended ACK request packet.
Figure 14:
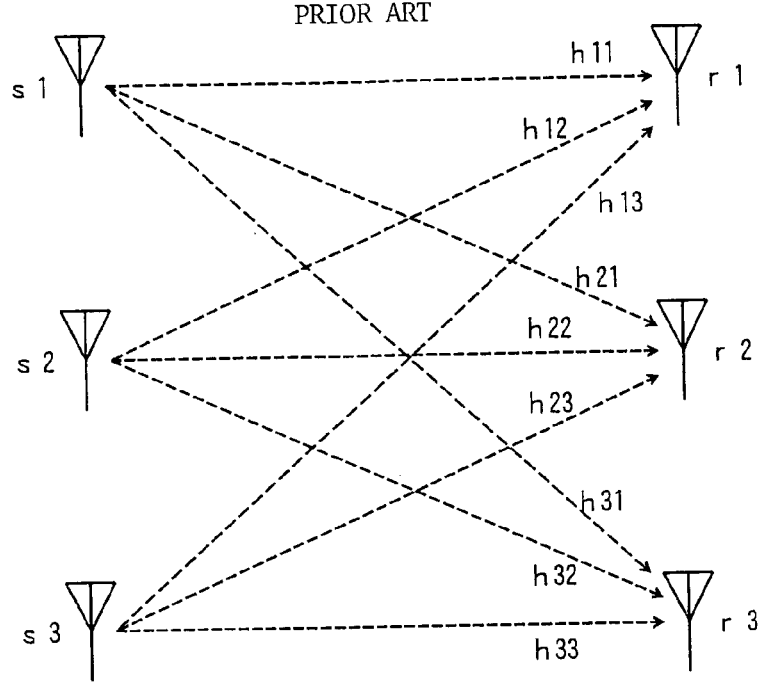
FIG. 14 shows a relationship between a transmitting signal and a receiving signal in MIMO.
Figure 15:
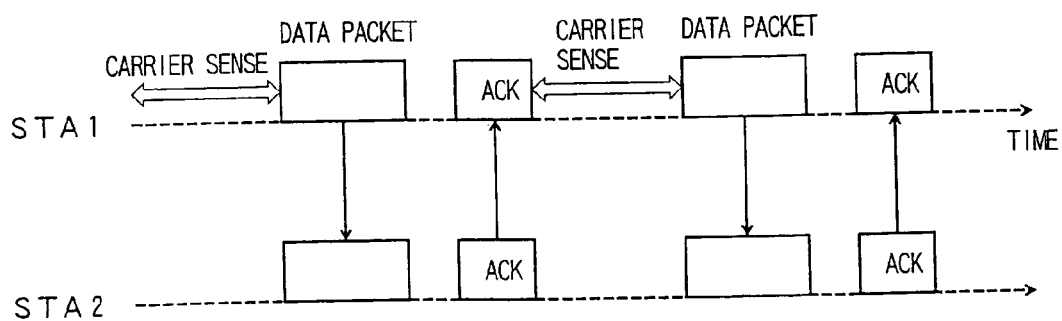
FIG. 15 shows a general processing on exchanging data packets.
Figure 16:
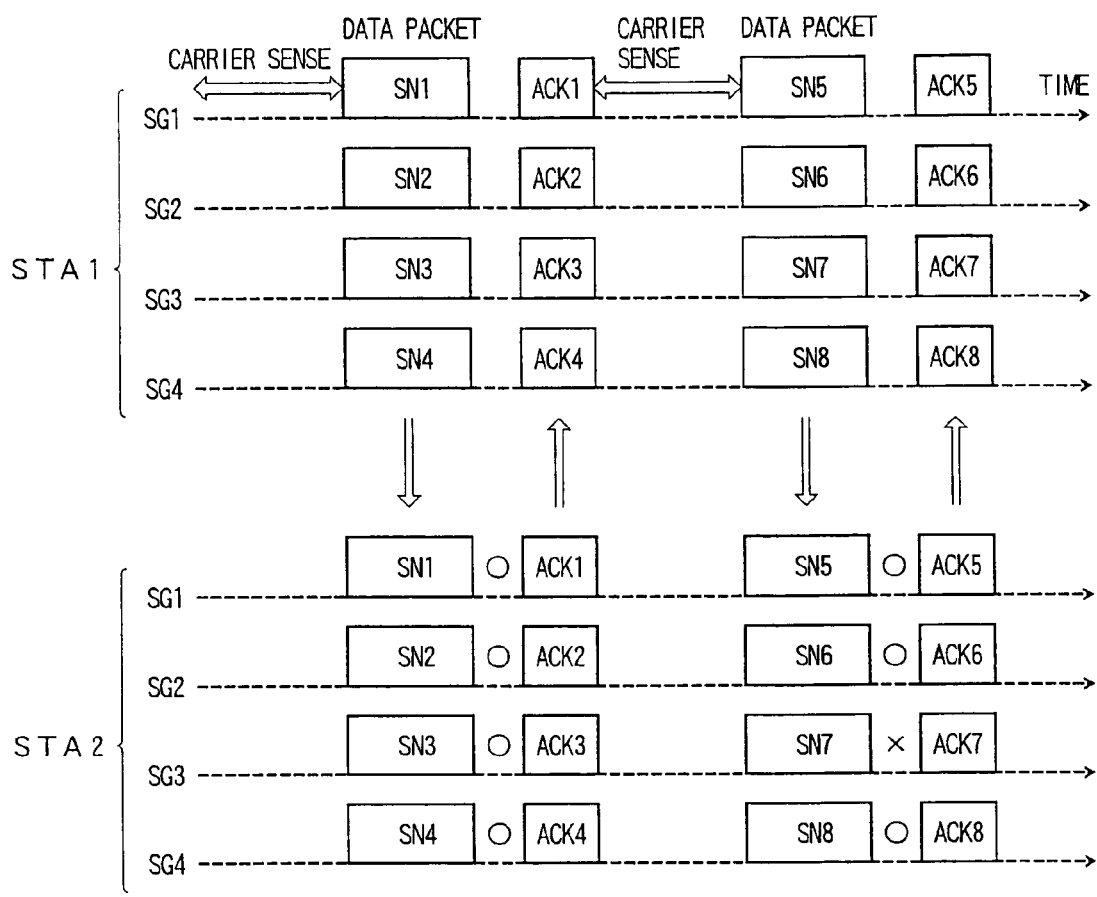
FIG. 16 shows an exemplary method for transmitting an ACK packet in MIMO.

Each of the extended ACK request packet and the extended NACK request packet contains packet type information, a receive-side STA ID (a receive-side STA of data packets), a transmit-side STA ID (a transmit-side STA of the data packets), and sequence numbers of all the data packets transmitted simultaneously in an example of FIG. 13(1). Alternatively, in an example of FIG. 13(2), instead of describing the sequence numbers of all the data packets transmitted simultaneously, the smallest sequence number of the data packets transmitted simultaneously and the number of the data packets transmitted simultaneously are described.

Referring to FIG. 3, a receive-side STA determines whether or not there is a receiving signal (S001). When sensing the receiving signal, the receive-side STA detects whether or not that receiving signal is an extended NACK request packet to the own STA (S101). In the case where the receiving signal is not the extended NACK request packet to the receive-side STA, the receive-side STA determines whether or not one or more data packets are received (S002). When receiving at least one data packet, the receive-side STA acquires a transmit-side STA ID, a receive-side STA ID, and information on a sequence number that are contained in each of all the received data packets (S003).

Then, the receive-side STA determines whether or not the received data packet is addressed to an own STA. When the received data packet is addressed to another STA, the receive-side STA discards the data packet (S004 and S008). When the received data packet is addressed to the own STA, the STA performs a receiving processing on each data packet (S005) and goes back to Step S001 in order to receive the extended NACK request packet to the own STA.

When receiving the extended NACK request packet in Step S101, the receive-side STA generates a single extended NACK packet containing information that corresponds to a sequence number of each data packet not received successfully among all the data packets for which information on success and failure in receiving is requested by that extended NACK request packet (S102). Then, the receive-side STA transmits the extended NACK packet to an STA that is a sender of the data packets without using MIMO (S103). Please note that, in the case where all the data packets transmitted simultaneously are successfully received, the extended NACK packet may not be generated.

In the case where there is no data packet successfully received in Step S002, the receive-side STA receives the extended NACK request packet to the own STA (S101) and generates a single extended NACK packet that contains information corresponding to a sequence number of each data packet not received successfully among all the data packets that are transmitted simultaneously in Step S102.

In the exemplary operation of FIG. 4, SG1 to SG4 represent signals of respective series multiplexed by MIMO. In this example, a case is considered in which signals of four series are multiplexed by MIMO. SN1 to SN4 represent sequence numbers of data packets, respectively. In this example, it is assumed that a data packet having a sequence number SN2 is not received successfully.

A transmit-side STA 1 transmits four data packets simultaneously on one wireless channel by using MIMO after carrier sense having a constant duration, and then transmits an extended NACK request packet. An STA 2 on a receiving side receives the extended NACK request packet and then generates a single extended NACK packet storing information on the sequence number SN2 of the data packet not received successfully. The STA 2 transmits the extended NACK packet to the STA 1 without multiplexing it by MIMO. The above operation is repeated.

Embodiment 3

Figure 5:
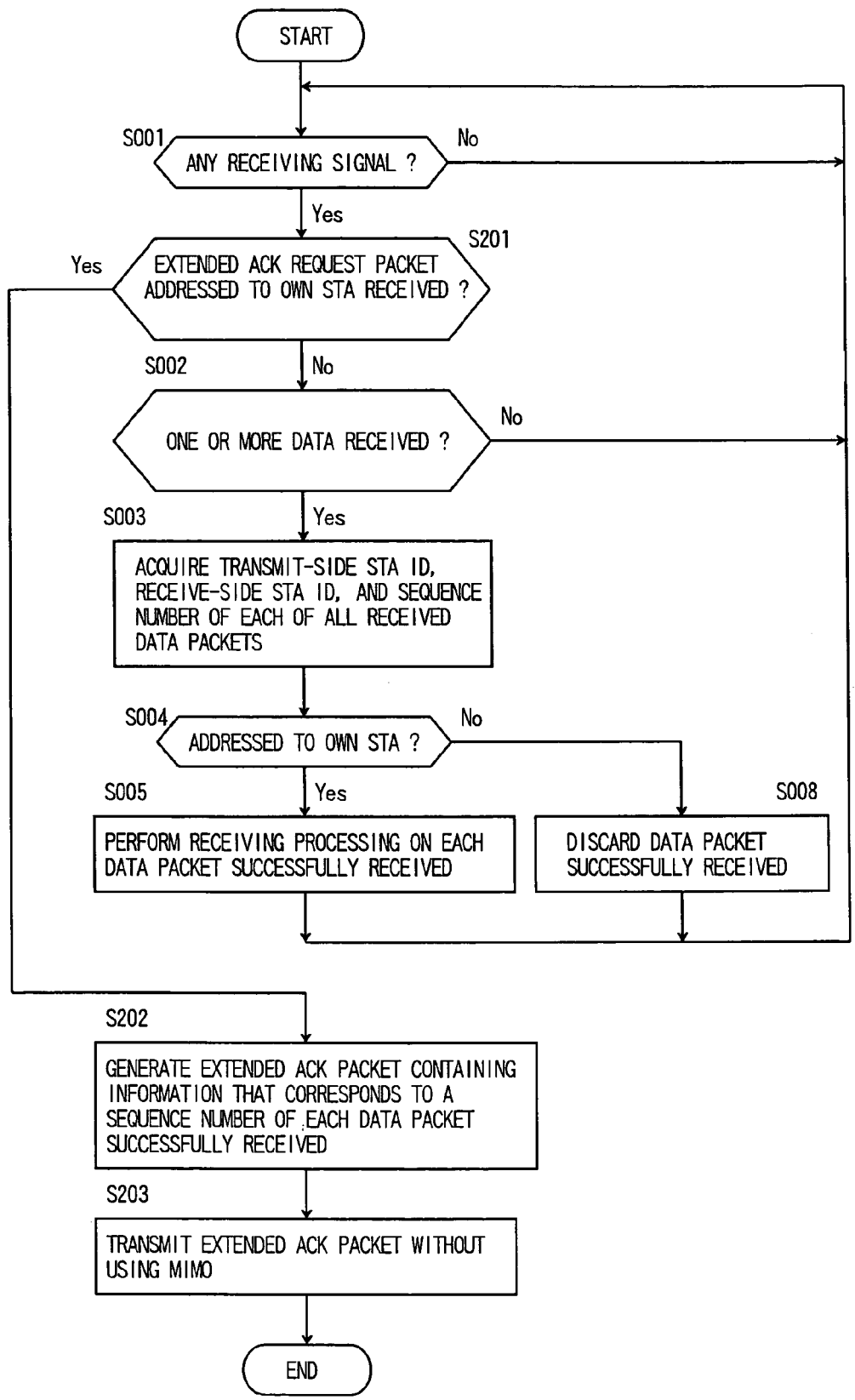
FIG. 5 is a flowchart according to a third embodiment of the present invention.
Figure 6:
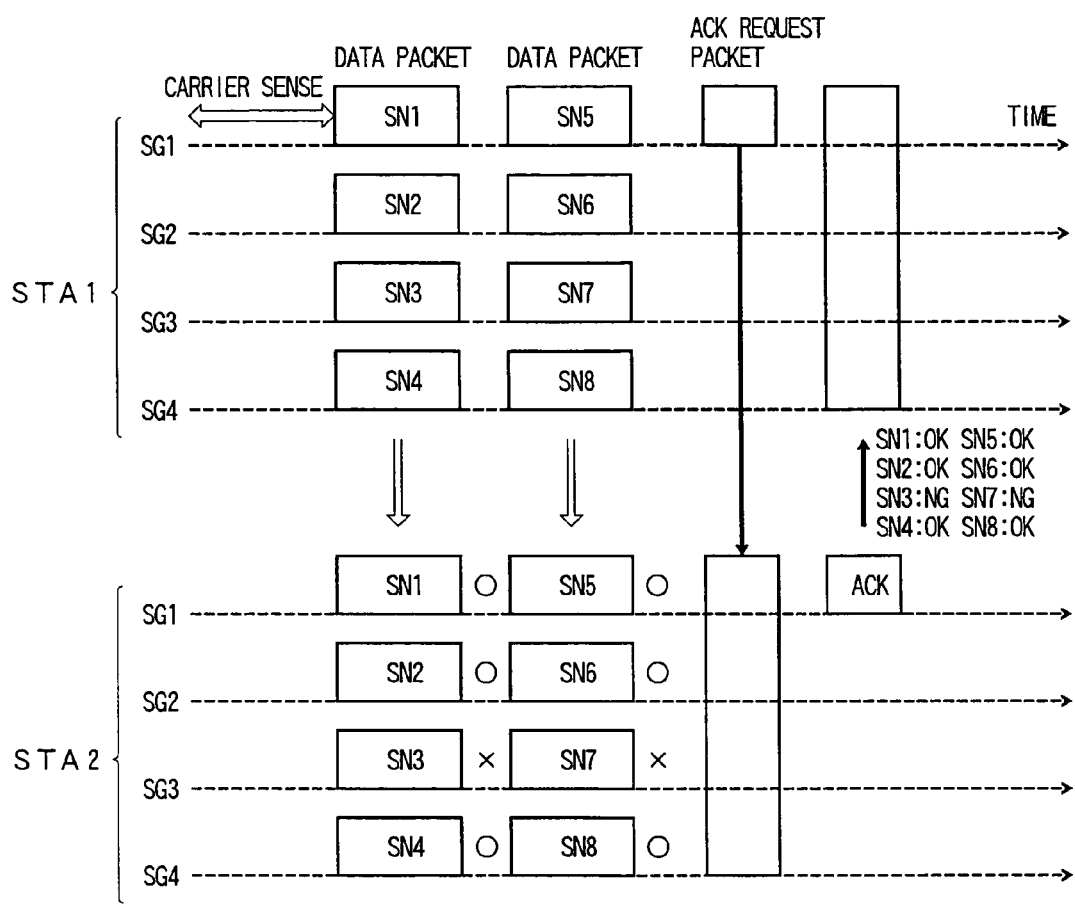
FIG. 6 is a time chart of an exemplary operation in the third embodiment of the present invention.

FIG. 5 is a flowchart according to a third embodiment of the present invention. FIG. 6 shows an exemplary operation in the third embodiment of the present invention.

In the present embodiment, a transmit-side STA 1 transmits four data packets (SN1 to SN4) simultaneously on one wireless channel by using MIMO after carrier sense having a constant duration, and then simultaneously transmits four data packets (SN5 to SN8) continuously by using MIMO. That is, the transmit-side STA 1 carries out continuous simultaneous transmission of data packets. Continuous transmission of data packets can use a Group ACK procedure discussed in IEEE802.11TGe or the like.

Figure 12:
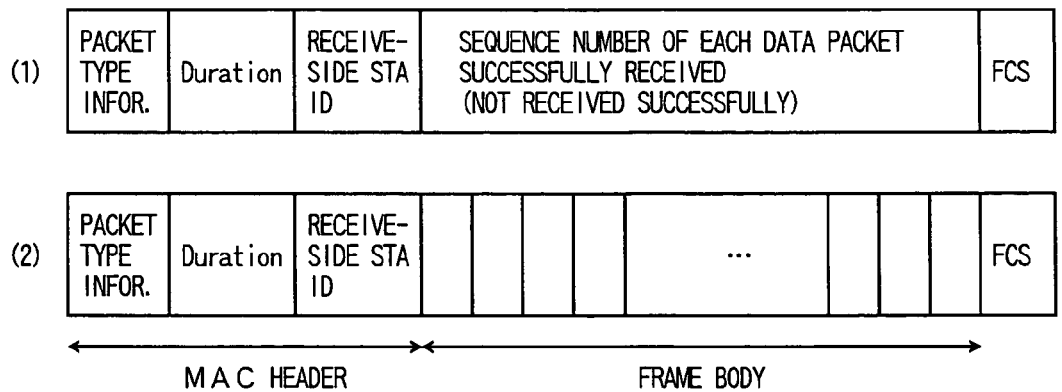
FIG. 12 illustrates structures of an extended ACK packet and an extended NACK packet.

An extended ACK request packet and an extended ACK packet used in the present embodiment have the structures shown in FIGS. 13 and 12, respectively.

Referring to FIG. 5, a receive-side STA determines whether or not there is a receiving signal (S001). When sensing the receiving signal, the receive-side STA detects whether or not the receiving signal is an extended ACK request packet to the own STA (S201). In the case where the receiving signal is not the extended ACK request packet to the receive-side STA, the own STA determines whether or not one or more data packets are received (S002). In the case where at least one data packet is received, the receive-side STA acquires a transmit-side STA ID, a receive-side STA ID, and information on a sequence number that are contained in each of all the received data packets (S003).

Then, the receive-side STA determines whether or not the received data packet is addressed to an own STA. In the case where the receive-side STA receives data packets is addressed to another STA, the receive-side STA discards those data packets (S004 and S008). In the case where the received data packet is addressed to the own STA, the STA performs a receiving processing on the respective data packets (S005) and goes back to Step S001 in order to receive data packets that are transmitted simultaneously continuously or an extended ACK request packet to the own STA. For the data packets transmitted simultaneously continuously, the receiving processing is repeated in Steps S001 to S005.

When receiving the extended ACK request packet in Step S201, the receive-side STA generates a single extended ACK packet containing information that corresponds to a sequence number of each data packet successfully received among all the data packets for which information on success and failure in receiving is requested by the received extended ACK request packet (S202). The receive-side STA then transmits the extended ACK packet to a transmit-side STA of the data packets without using MIMO (S203).

In the case where there is no data packet successfully received in Step S002, the receive-side STA receives the extended ACK request packet to the own STA (S201) and generates a single extended ACK packet indicating that all the data packets transmitted simultaneously is not received successfully (S202).

In the exemplary operation of FIG. 6, SG1 to SG4 represent signals of respective series multiplexed by MIMO. In this example, a case is considered in which signals of four series are multiplexed by MIMO. SN1 to SN8 represent sequence numbers of data packets, respectively. In this example, data packets having sequence numbers SN1 to SN4 are transmitted simultaneously, and thereafter data packets having sequence numbers SN5 to SN8 are transmitted simultaneously continuously.

A transmit-side STA 1 simultaneously transmits eight data packets continuously on one wireless channel by using MIMO after carrier sense having a constant duration. Then, the transmit-side STA 1 transmits an extended ACK request packet. An STA 2 on a receiving side receives the extended ACK request packet and then generates a single extended ACK packet storing information on a sequence number of each data packet successfully received. The STA 2 transmits the extended ACK packet to the STA 1 without multiplexing it by MIMO. The above operation is repeated.

Embodiment 4

Figure 7:
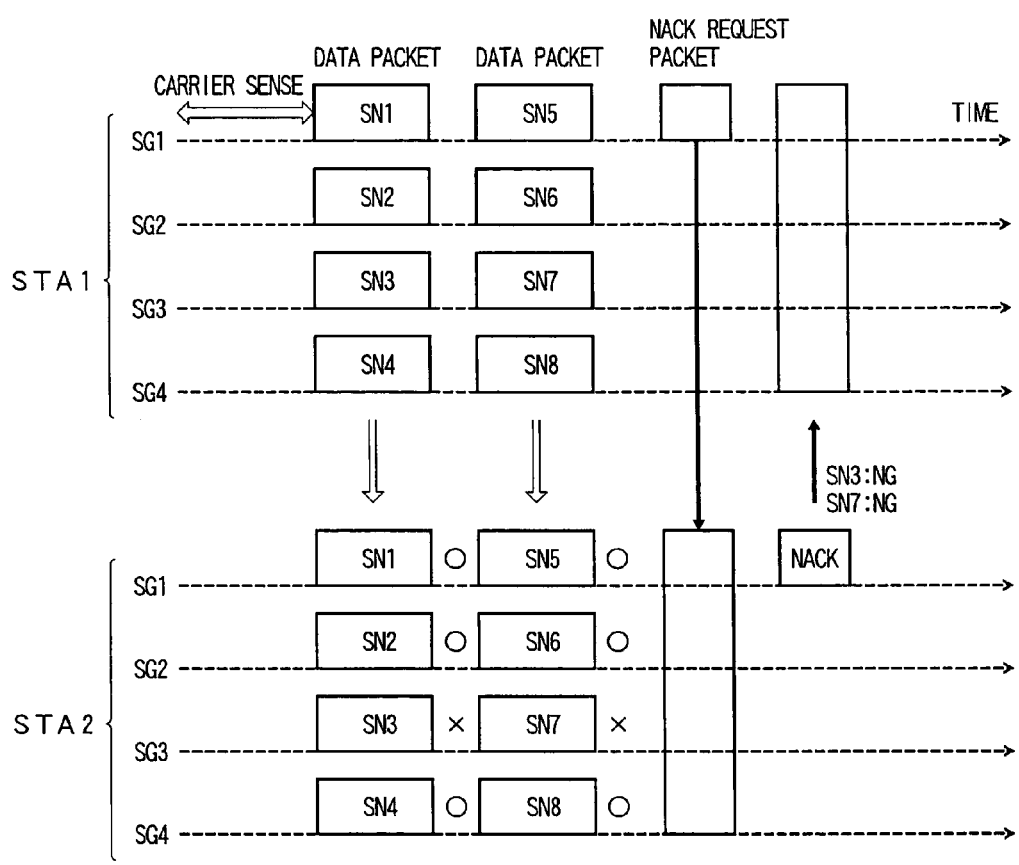
FIG. 7 is a time chart of an exemplary operation of a fourth embodiment of the present invention.

A fourth embodiment has a feature that the extended ACK request packet transmitted from the transmit-side STA is replaced with an extended NACK request packet and the extended ACK packet transmitted from the receive-side STA is replaced with an extended NACK packet in the third embodiment shown in FIG. 5. A procedure is basically the same as that in the third embodiment. FIG. 7 shows an exemplary operation in the fourth embodiment of the present invention.

In the exemplary operation of FIG. 7, SG1 to SG4 represent signals of respective series multiplexed by MIMO. In this example, a case is considered in which signals of four series are multiplexed by MIMO. SN1 to SN8 represent sequence numbers of data packets, respectively. Data packets respectively having sequence numbers SN1 to SN4 are transmitted simultaneously, and thereafter data packet respectively having sequence numbers SN5 to SN8 are transmitted simultaneously continuously. In this example, data packets having sequence numbers SN3 and SN7 is not received successfully.

A transmit-side STA 1 simultaneously transmits eight data packets continuously on one wireless channel by using MIMO after carrier sense having a constant duration, and then transmits an extended NACK request packet. An STA 2 on a receiving side receives the extended NACK request packet and then generates a single extended NACK packet storing therein information on the sequence numbers SN3 and SN7 of the data packets not received successfully. The STA 2 transmits the extended NACK packet to the STA 1 without multiplexing it by MIMO. The above operation is repeated.

Embodiment 5

Figure 8:
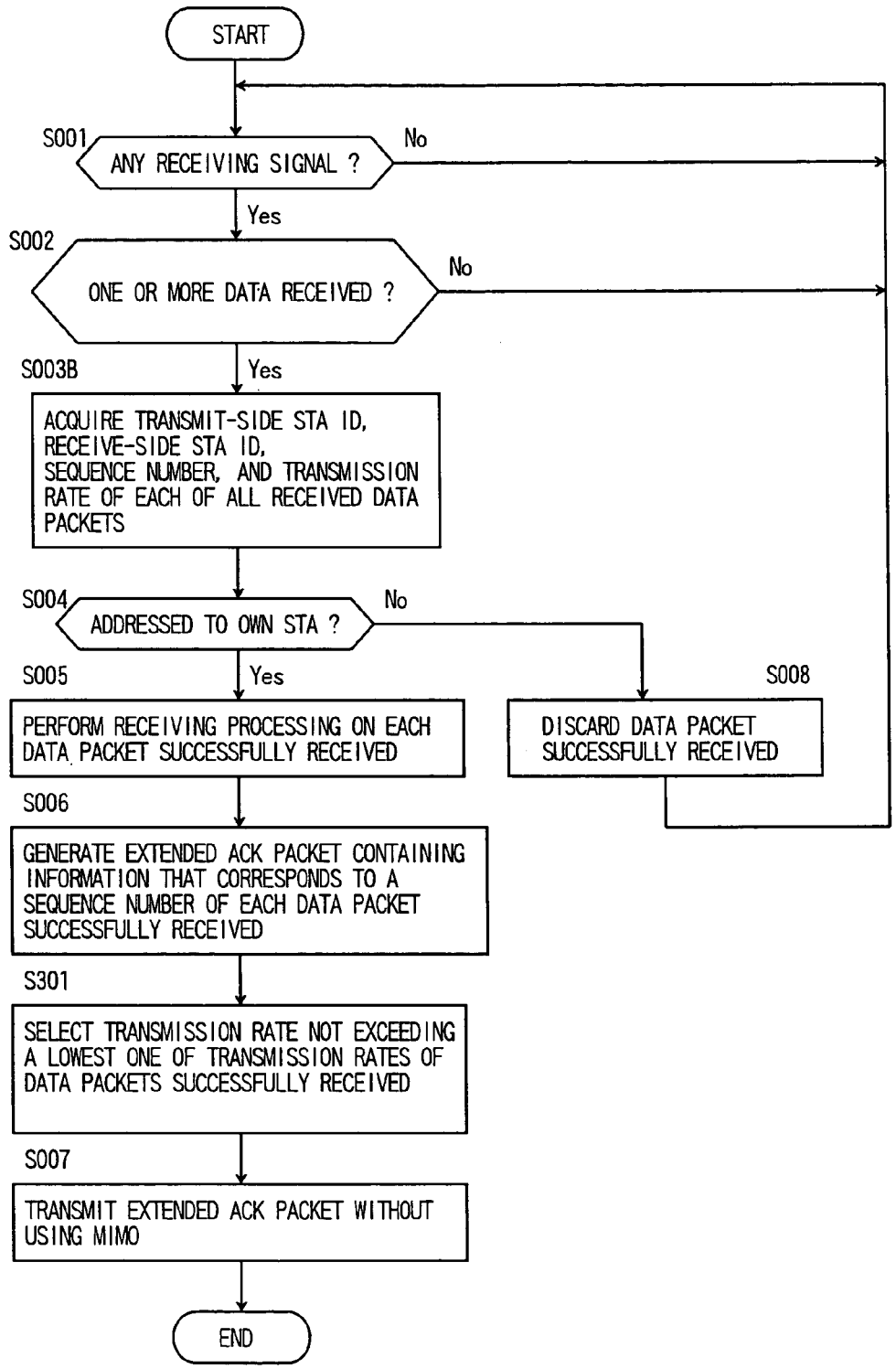
FIG. 8 is a flowchart according to a fifth embodiment of the present invention.
Figure 9:
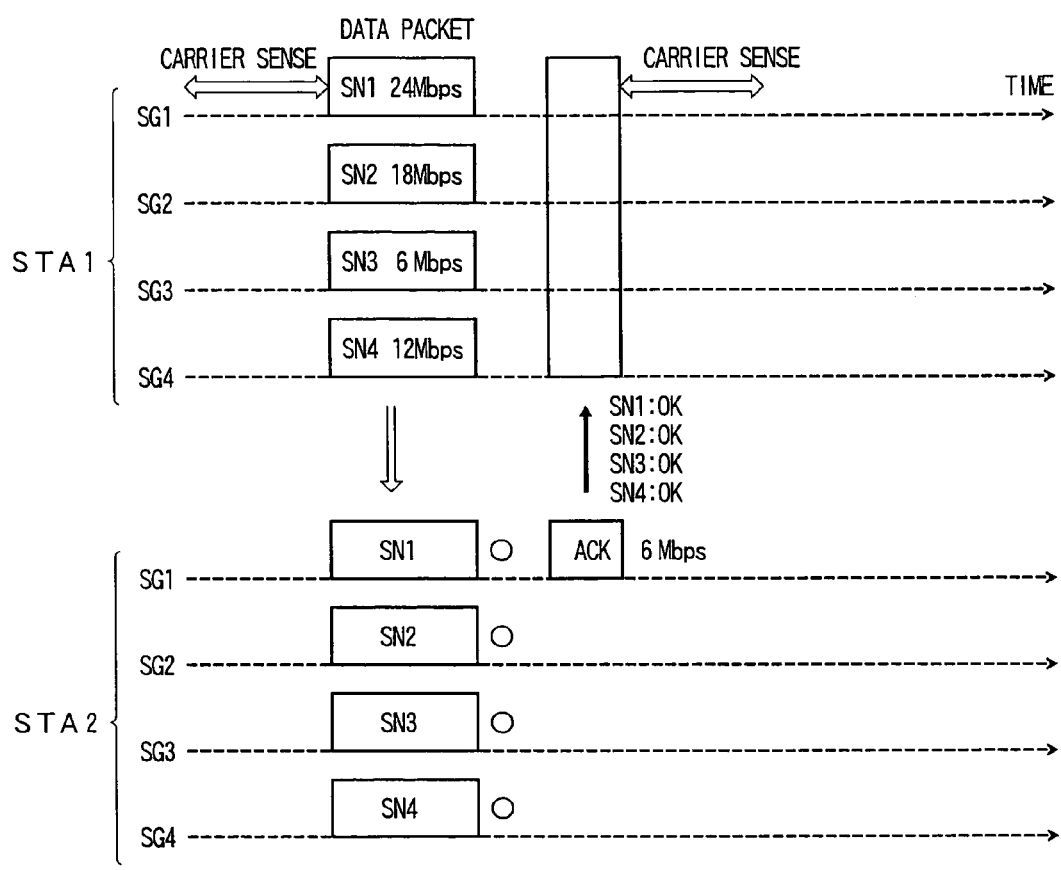
FIG. 9 is a time chart of an exemplary operation in the fifth embodiment of the present invention.

FIG. 8 is a flowchart according to a fifth embodiment of the present invention. FIG. 9 shows an exemplary operation of the fifth embodiment of the present invention.

In the present embodiment, a transmission rate of the extended ACK packet or extended NACK packet is selected in the case where transmission rates for respective series multiplexed by MIMO can be independently set in the first to fourth embodiments. For example, a lowest one of transmission rates of a plurality of data packets successfully received or a lowest one of transmission rates for respective series that are preset is selected.

The flowchart shown in FIG. 8 is similar to that in the first embodiment. Changed parts in this flowchart are now described.

In Step S003B in FIG. 8, a receive-side STA acquires a transmit-side STA ID, a receive-side STA ID, and a sequence number for each data packet, and also acquires a transmission rate (a bit rate in transmission) of each data packet. The procedure then goes from Step S006 to Step S301 where the receive-side STA selects a transmission rate that does not exceed the lowest one of the transmission rates of the data packets successfully received, as a transmission rate used for transmission from the own STA. Therefore, when transmitting the extended ACK packet in Step S007, the receive-side STA uses a series corresponding to the selected transmission rate.

In the case where the lowest one of the transmission rates for respective preset series is selected as the transmission rate of the extended ACK packet, it is not necessary to acquire the transmission rate of each received data packet in Step S003B.

In the exemplary operation of FIG. 9, SG1 to SG4 represent signals of respective series that are multiplexed by MIMO. In this example, a case is considered in which signals of four series are multiplexed by MIMO. SN1 to SN8 represent sequence numbers of data packets, respectively. Transmission rates for SG1 to SG4 are 24 Mbps, 18 Mbps, 6 Mbps, and 12 Mbps, respectively.

A transmit-side STA 1 transmits four data packets simultaneously on one wireless channel by using MIMO after carrier sense having a constant duration. An STA 2 on a receiving side receives the four data packets transmitted simultaneously and acquires transmission rates of the respective data packets. Then, the STA 2 generates an extended ACK packet that stores information corresponding to a sequence number of each data packet successfully received. The STA 2 selects 6 Mbps that is the lowest transmission rate in the case where all the data packets are successfully received, as the lowest one of the transmission rates of a plurality of data packets received at the same time. The extended ACK packet is transmitted to the STA 1 at a transmission rate of 6 Mbps without being multiplexed by MIMO. The above operation is repeated.

Embodiment 6

Figure 10:
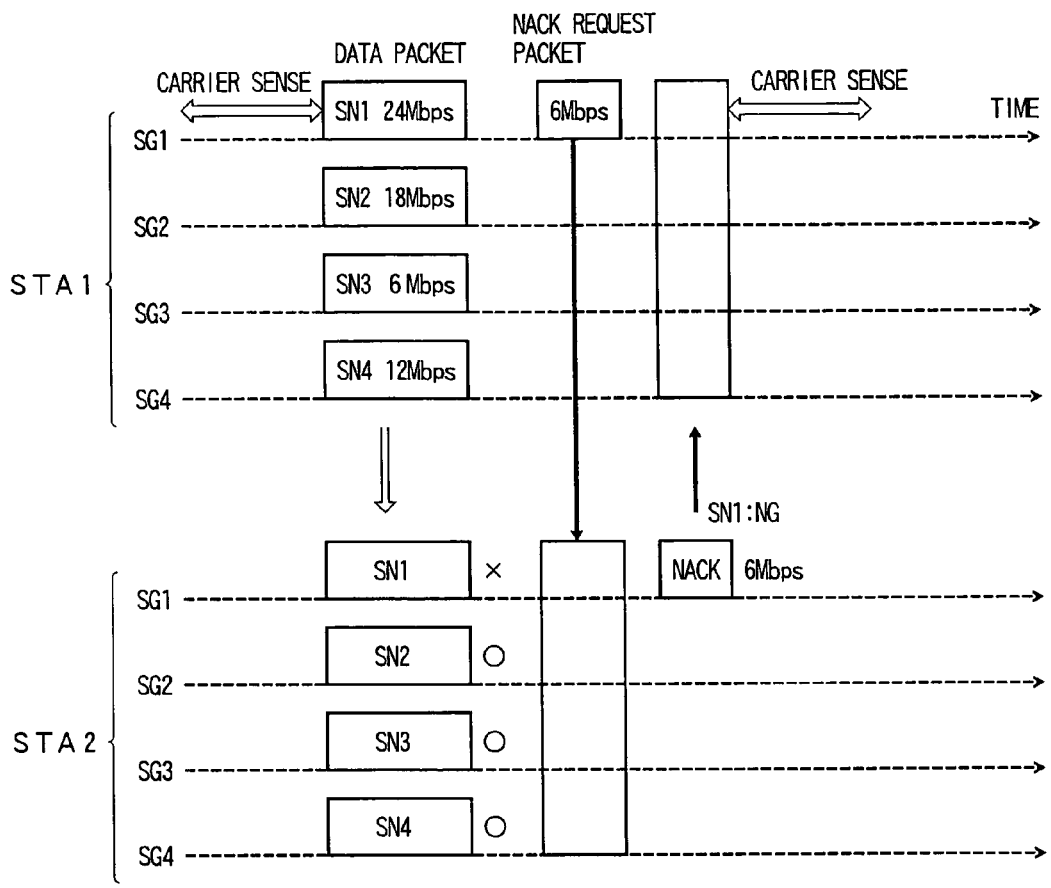
FIG. 10 is a time chart of an exemplary operation in a sixth embodiment of the present invention.

In a sixth embodiment, a transmission rate of an extended ACK request packet or an extended NACK request packet and a transmission rate of an extended ACK packet or an extended NACK packet are selected in the case where transmission rates for respective series that are multiplexed by MIMO can be independently set in the second to fourth embodiments. For example, the lowest one of the transmission rates for respective series that are present is selected as the transmission rate of the extended ACK request packet or extended NACK request packet, while a transmission rate that does not exceed the lowest transmission rate of a plurality of data packets successfully received is selected as the transmission rate of the extended ACK packet or extended NACK packet. FIG. 10 is a time chart showing an exemplary operation corresponding to the sixth embodiment.

In the exemplary operation of FIG. 10, SG1 to SG4 represent signals of respective series multiplexed by MIMO. In this example, a case is considered in which signals of four series are multiplexed by MIMO. SN1 to SN4 represent sequence numbers of data packets, respectively. Transmission rates for SG1 to SG4 are 24 Mbps, 18 Mbps, 6 Mbps, and 12 Mbps, respectively.

A transmit-side STA 1 transmits four data packets simultaneously on one wireless channel by using MIMO after carrier sense having a constant duration, and then transmits an extended NACK request packet at a transmission rate of 6 Mbps that is the lowest one of the transmission rates for the respective series without using MIMO. An STA 2 on a receiving side receives the four data packets transmitted simultaneously and the extended NACK request packet transmitted without using MIMO. Then, the STA 2 generates an extended NACK packet storing information that corresponds to a sequence number of each data packet not received successfully. The STA 2 selects 6 Mbps as the lowest one of the transmission rates of the data packets received at the same time, in the case where all the data packets are successfully received. The extended ACK packet is transmitted to the STA 1 at a transmission rate of 6 Mbps without being multiplexed by MIMO. The above operation is repeated.

The invention is not limited to the above embodiments and various modifications may be made without departing from the spirit and scope of the invention. Any improvement may be made in part or all of the components.

INDUSTRIAL APPLICABILITY

According to the present invention, a reception ACK packet (an ACK packet, a NACK packet) and a reception ACK request packet (an ACK request packet, a NACK request packet) are transmitted without being multiplexed by MIMO. This increases a ratio of successful receptions to total receptions. Thus, it is possible to reduce occurrence of incidents that a sender STA unnecessarily retransmits data packets, faultily recognizing a receiving condition of data packets in a receive-side STA, which can improve the throughput.

The invention claimed is:

1. A wireless packet communication method for transmitting a plurality of data packets simultaneously between two stations ("STAs") by using a wireless channel and MIMO, characterized by comprising:
   including predetermined sequence numbers in said plurality of data packets, respectively, the predetermined sequence numbers being for distinguishing said plurality of data packets from each other; and
   generating a single acknowledgement ("ACK") packet at an STA which has received a plurality of data packets transmitted simultaneously by using Multiple Input Multiple Output ("MIMO"), and transmitting the single ACK packet to a transmit-side STA from the STA without using MIMO, the single ACK packet containing information that corresponds to a sequence number of a data packet successfully received.

2. A wireless packet communication method for transmitting a plurality of data packets simultaneously between two STAs by using a wireless channel and MIMO, characterized by comprising:
   including predetermined sequence numbers in said plurality of data packets, respectively, the predetermined sequence numbers being for distinguishing said plurality of data packets from each other;
   transmitting a plurality of data packets simultaneously from a transmit-side STA by using MIMO and thereafter transmitting a NACK request packet from the transmit-side STA without using MIMO, the negative acknowledgement ("NACK") request packet being for requesting a NACK packet from a receive-side STA and containing information that corresponds to sequence numbers of all of data packets transmitted simultaneously; and
   receiving a plurality of data packets transmitted simultaneously by using MIMO and generating a single NACK packet at the receive-side STA, and transmitting the single NACK packet to the transmit-side STA from the receive-side STA without using MIMO, the single NACK packet containing information that corresponds to a sequence number of a data packet not received successfully among the sequence numbers acquired by receiving said NACK request packet.

3. A wireless packet communication method for transmitting a plurality of data packets simultaneously between two STAs by using a wireless channel and MIMO, characterized by comprising:
   including predetermined sequence numbers in said plurality of data packets, respectively, the predetermined sequence numbers being for distinguishing said plurality of data packets from each other;
   simultaneously transmitting a plurality of data packets continuously from a transmit-side STA by using MIMO, and thereafter transmitting an ACK request packet from the transmit-side STA without using MIMO, the ACK request packet being for requesting an ACK packet from a receive-side STA and containing information that corresponds to sequence numbers of all the data packets transmitted simultaneously continuously; and
   receiving the plurality of data packets transmitted simultaneously continuously by using MIMO and generating a single ACK packet at the receive-side STA, and transmitting the single ACK packet to the transmit-side STA from the receive-side STA without using MIMO, the single ACK packet containing information that corresponds to sequence numbers of data packets successfully received among the sequence numbers acquired by receiving said ACK request packet.

4. A wireless packet communication method for transmitting a plurality of data packets simultaneously between two STAs by using a wireless channel and MIMO, characterized by comprising:
   including predetermined sequence numbers in said plurality of data packets, respectively, the predetermined sequence numbers being for distinguishing said plurality of data packets from each other; and
   simultaneously transmitting a plurality of data packets continuously from a transmit-side STA by using MIMO, and thereafter transmitting a NACK request packet from the transmit-side STA without using MIMO, the NACK request packet being for requesting a NACK packet from a receive-side STA and containing information that corresponds to sequence numbers of all the data packets transmitted simultaneously continuously;
   receiving the plurality of data packets transmitted simultaneously continuously by using MIMO and generating a single NACK packet at the receive-side STA, and transmitting the single NACK packet to the transmit-side STA from the receive-side STA without using MIMO, the single NACK packet containing information that corresponds to a sequence number of a data packet not successfully received among the sequence numbers acquired by receiving said NACK request packet.

5. The wireless communication method according to claim 1 or 3, characterized in that
   the STA transmitting said ACK packet transmits said ACK packet at a transmission rate that falls within a range from a lowest one of transmission rates the STA has to a lowest one of transmission rates at which the STA has successfully received data packets.

6. The wireless packet communication method according to claim 2 or 4, characterized in that
   the STA transmitting said NACK packet transmits said NACK packet at a transmission rate that falls within a range from a lowest one of transmission rates the STA has to a lowest one of transmission rates at which the STA has successfully received data packets.

7. The wireless packet communication method according to any one of claims 2, 3, and 4, characterized in that
   the STA transmitting said ACK request packet or said NACK request packet transmits said ACK request packet or said NACK request packet at a transmission rate that falls within a range from a lowest one of transmission rates the STA has to a lowest one of transmission rates at which the STA has transmitted data packets.

8. A wireless packet communication apparatus for transmitting a plurality of data packets simultaneously between two STAs by using a wireless channel and MIMO, characterized by comprising:
   a transmit-side STA comprising a unit allowing predetermined sequence numbers to be included in said plurality of data packets, respectively, and transmitting said plurality of data packets simultaneously by using MIMO, the predetermined sequence numbers being for distinguishing said plurality of data packets from each other; and a receive-side STA comprising: a unit receiving a plurality of data packets transmitted simultaneously by using MIMO; a unit generating a single ACK packet containing information that corresponds to a sequence number of a data packet successfully received; and a unit transmitting said ACK packet to the transmit-side STA without using MIMO.

9. A wireless packet communication apparatus for transmitting a plurality of data packets simultaneously between two STAs by using a wireless channel and MIMO, characterized by comprising:

a transmit-side STA comprising: a unit allowing predetermined sequence numbers to be included in said plurality of data packets, respectively, and transmitting said plurality of data packets simultaneously by using MIMO, the predetermined sequence numbers being for distinguishing said plurality of data packets from each other; and a unit transmitting a NACK request packet without using MIMO after the simultaneous transmission of said plurality of data packets, the NACK request packet being for requesting a NACK packet from a receive-side STA and containing information that corresponds to the sequence numbers of all of the data packets transmitted simultaneously; and a receive-side STA comprising: a unit receiving the plurality of data packets transmitted simultaneously by using MIMO; a unit generating a single NACK packet containing information that corresponds to a sequence number of a data packet not successfully received among the sequence numbers acquired by receiving said NACK request packet; and a unit transmitting said NACK packet to the transmit-side STA without using MIMO.

10. A wireless packet communication apparatus for transmitting a plurality of data packets simultaneously between two STAs by using a wireless channel and MIMO, characterized by comprising:

a transmit-side STA comprising: a unit allowing predetermined sequence numbers to be included in said plurality of data packets, respectively, and simultaneously transmitting said plurality of data packets continuously by using MIMO, the predetermined sequence numbers being for distinguishing said plurality of data packets from each other; and a unit transmitting an ACK request packet without using MIMO after the continuous simultaneous transmission of said plurality of data packets, the ACK request packet being for requesting an ACK packet from a receive-side STA and containing information that corresponds to the sequence numbers of all of the data packets transmitted simultaneously continuously; and a receive-side STA comprising: a unit receiving the plurality of data packets transmitted simultaneously continuously by using MIMO; a unit generating a single ACK packet containing information that corresponds to a sequence number of a data packet successfully received among the sequence numbers acquired by receiving said ACK request packet; and a unit transmitting said ACK packet to the transmit-side STA without using MIMO.

11. A wireless packet communication apparatus for transmitting a plurality of data packets simultaneously between two STAs by using a wireless channel and MIMO, comprising by:

a transmit-side STA comprising: a unit allowing predetermined sequence numbers to be included in said plurality of data packets, respectively, and simultaneously transmitting said plurality of data packets continuously by using MIMO, the predetermined sequence numbers being for distinguishing said plurality of data packets from each other; and a unit transmitting a NACK request packet without using MIMO after the continuous simultaneous transmission of said plurality of data packets, the NACK request packet being for requesting a NACK packet from a receive-side STA and containing information that corresponds to the sequence numbers of all of the data packets transmitted simultaneously continuously; and the receive-side STA comprising: a unit receiving the plurality of data packets transmitted simultaneously continuously by using MIMO; a unit generating a single NACK packet containing information that corresponds to a sequence number of a data packet not received successfully among the sequence numbers acquired by receiving said NACK request packet; and a unit transmitting said NACK packet to the transmit-side STA without using MIMO.

12. The wireless packet communication apparatus according to claim 8 or 10, characterized in that the STA transmitting said ACK packet includes a unit transmitting said ACK packet at a transmission rate that falls within a range from a lowest one of transmission rates the STA has to a lowest one of transmission rates at which the STA has successfully received data packets.

13. The wireless packet communication apparatus according to claim 9 or 11, characterized in that the STA transmitting said NACK packet includes a unit transmitting said NACK packet at a transmission rate that falls within a range from a lowest one of transmission rates the STA has to a lowest one of transmission rates at which the STA has successfully received data packets.

14. The wireless packet communication apparatus according to any one of claims 9,10, and 11, characterized in that the STA transmitting said ACK request packet or said NACK request packet includes a unit transmitting said ACK request packet or said NACK request packet at a transmission rate that falls within a range from a lowest one of transmission rates the STA has to a lowest one of transmission rates at which the STA has transmitted data packets.

* * * * *